UNITED STATES PATENT OFFICE.

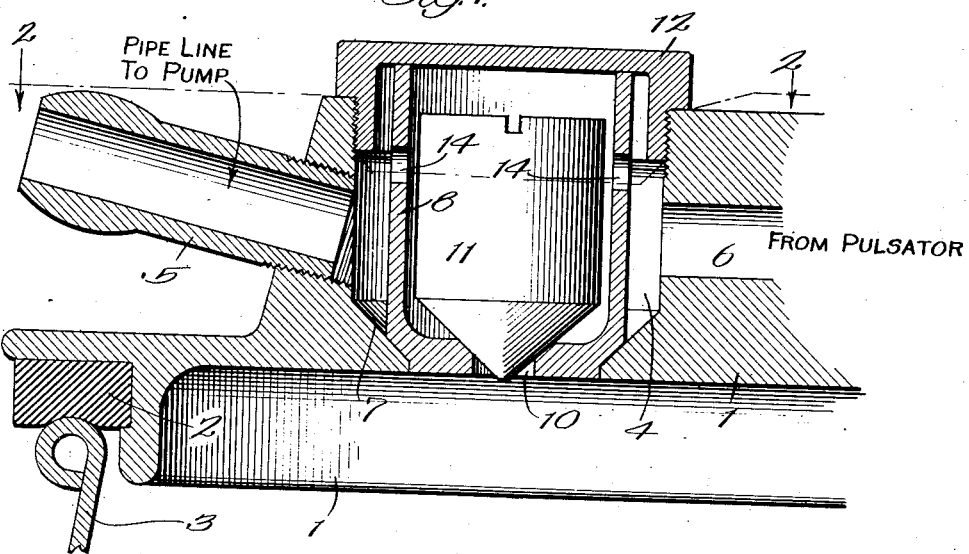
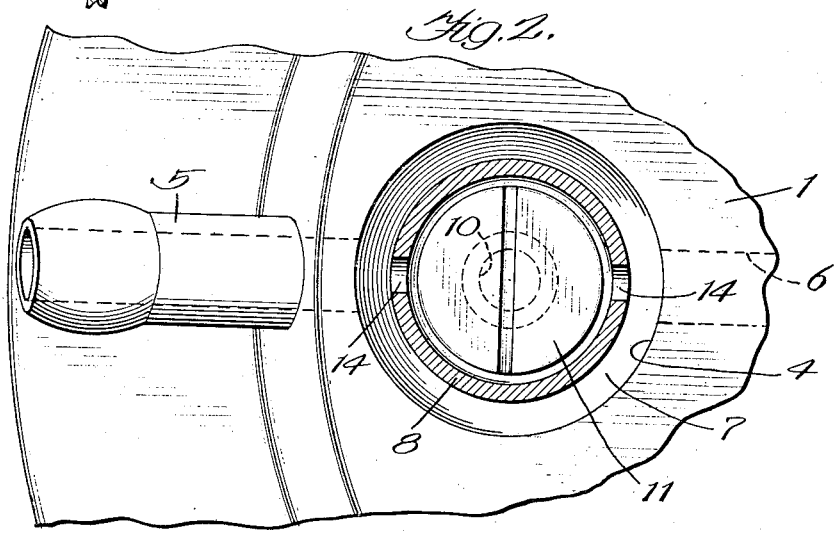
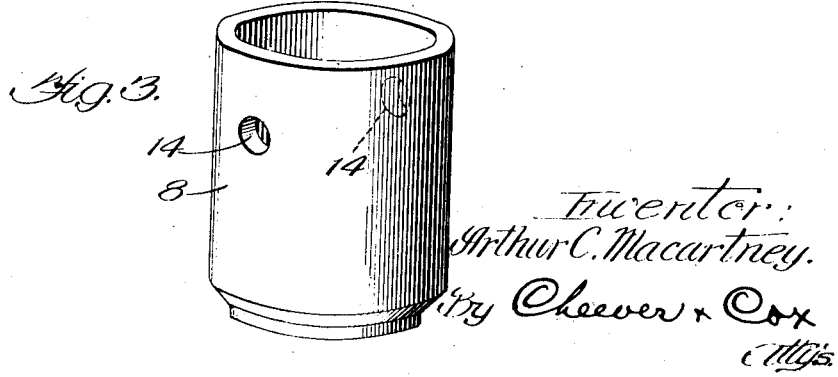

ARTHUR C. MACARTNEY, OF SYRACUSE, NEW YORK, ASSIGNOR TO PINE TREE MILKING MACHINE COMPANY, OF CHICAGO, ILLINOIS, A CORPORATION OF ILLINOIS.

MILKING-MACHINE.

1,344,140.  Specification of Letters Patent.  Patented June 22, 1920.

Application filed May 24, 1919. Serial No. 299,507.

*To all whom it may concern:*

Be it known that I, ARTHUR C. MACARTNEY, a subject of the King of Great Britain, residing at Syracuse, in the county of Onondaga and State of New York, have invented a certain new and useful Improvement in Milking-Machines, of which the following is a specification.

My invention relates to milking machines of the general type shown in my prior Patent No. 1,266,697, granted May 21, 1918. The machine is of that class in which the moving parts are actuated by pulsatory air, the pulsations being produced by pulsators,—devices which are well known in the milking machine art. One of the objects of this invention is to provide means for preventing the oil employed to lubricate the pulsator from gaining access to the milk pail.

In milking machines of the class mentioned, the milk pail is kept under vacuum. This vacuum is created by a distant air pump and the air is exhausted from the pail through a pipe line or duct which leads from an opening in the pail cover. In the machines heretofore employed it has frequently been found that the milk within the pail contained a very high bacteria count for some unexplainable reason. I have found that where conditions are otherwise proper an excessive bacteria count is generally caused by letting milk get into the exhaust pipe line. This may be caused by letting the milk pail get too full and handling it roughly so that milk surges up past the check valve and is drawn into the vacuum line. But it is more frequently caused by the collection of vapor in these parts. It will be understood that as the fresh milk is warm, vapor is apt to rise from it, sometimes in considerable quantities Besides this, the milk usually has more or less froth or foam upon it and this and the vapor tend to be drawn up past the check valve into the exhaust pipe line or vacuum duct. This line and its immediate connections cannot be easily inspected or cleaned, and if milk is permitted to get into them, they become foul and form a ready source of contamination. An important object of my invention is to provide means for effectively preventing any milk which may get into the pipe line from returning to the pail. Another object is to so construct the parts that they may be readily cleaned.

I accomplish my objects by the mechanism illustrated in the accompanying drawings, in which—

Figure 1 is a sectional elevation of a portion of the milk pail cover containing the parts most vitally concerned with my invention.

Fig. 2 is a plan view taken on the line 2—2, Fig. 1.

Fig. 3 is a perspective view of the valve seat and trap which form important elements of the invention.

Like numerals denote like parts throughout the several views.

In the particular embodiment of the invention chosen to illustrate its principle, the milk pail cover 1 has a gasket 2 adapted to rest upon the upper edge of the milk pail 3. The pail cover has a chamber 4 which communicates at one side with the nipple 5 which forms a connection to the pipe line leading to the air pump (not shown). Also connecting with the chamber 4 is a passage 6 which communicates with the pulsator. As pulsators for milking machines are well known it is unnecessary to describe them here.

The chamber 4 has an annular opening at the bottom leading to the inside of the pail. In the present case this is surrounded by a conical seat 7 for a cylindrical valve seat and trap 8. Said part 8 has a port 10 in the bottom which coöperates with a check valve 11. Said valve has a conical lower end which when seated, prevents air from entering the pail. Part 8 is held firmly seated by means of a screw cap 12 which screws into the upper end of chamber 4 and engages the upper end of part 8. Said part 8 has two or more ports 14 located near the upper end. The check valve does not entirely fill the part 8—hence there is space for air between the sides of the valve and the inside of the part 8.

In practice the parts operate as follows:— When the parts are assembled as shown, there is no chance for leakage between the valve seat 7 and the lower end of the part 8. Hence there is no possibility of anything entering the pail unless it first passes through one of the ports 14 which, as above stated, are located at a point much higher than the bottom of the chamber 4. As it is seldom that more than two or three drops of oil escape from the pulsator, through passage 6, there is no possibility, practically speaking, that enough oil can collect to rise to the level of the ports 14. With the case of the milk, however, it is somewhat different, and an appreciable amount of milk is apt to condense and collect in the chamber 4. In case enough milk collects to cause the surface level to rise as high as the mouth of nipple 5 milk will be drawn through said nipple and up into the pipe line, where it can do no particular harm. It will be understood, of course, that the flow in the nipple 5 is always toward the pump and hence the tendency is always to draw any milk or air which may be in the nipple away from the pail. In any event, no liquid, either oil or milk will ever be able to rise high enough in chamber 4 to permit it to flow back to the inside of the part 8 and thence into the pail.

From the foregoing it will be evident that with my device it will be practically impossible for oil at any time to reach the milk in the pail. It will also be evident that the milk from the pail, even though caused to surge a good deal will not in any considerable quantity pass out of the space within the part 8. But if, owing to a particularly full pail or careless handling of the pail, milk should be forced out through the ports 14, it will flow down the outside of part 8 and be retained in the space between said part and the walls of the chamber 4. If a considerable amount of milk should get into this space, it will be drawn off by the vacuum in the pipe line leading to the air pump.

It will be noted that the parts of my device may be readily cleaned, for by unscrewing the cap 12 both the check valve and the part 8 may be lifted out. As they are of simple form they may be readily washed, and as the chamber 4 is also of simple, open form it, too, may be readily cleansed.

I have found by experience that by using my device, if other conditions are suitable, the bacteria count will uniformly be kept at a minimum.

Having thus described my invention what I claim as new and desire to secure by Letters Patent, is:—

1. In a milking machine, a milk pail cover having a valve chamber with a port leading to the inside of the pail, a vacuum duct leading from said chamber for creating a vacuum therein and in the pail, a check valve adapted to control said port, and a dam rising from the bottom of the chamber and spaced from the walls thereof for retaining any liquid that may gain access to said chamber.

2. In a milking machine, the combination, with the milk pail and pulsator, of a milk pail cover having a valve chamber with a port at the bottom leading to the inside of the pail, a duct leading to said chamber from the pulsator, means for exhausting the air from said chamber to thereby create a vacuum in it, a check valve adapted to control said port, and an annular wall rising from the bottom of the chamber and spaced from the sides thereof, there being a passage through the wall at a considerable distance from the bottom thereof.

3. In a milking machine, a milk pail cover having a valve chamber with a port leading to the inside of the pail, a vacuum duct leading from said chamber for creating a vacuum therein, a check valve adapted to control said port, a cylindrical dam rising from the bottom of the chamber and spaced from the walls thereof, said dam having a port in the side and rising to the top of the chamber and surrounding the check valve.

4. In a milking machine, the combination with the milk pail, of a pail cover having a valve chamber with a port leading to the inside of the pail, a vacuum duct leading from said chamber for creating a vacuum therein, a check valve adapted to control said port, a removable cylindrical dam rising from the bottom of the chamber and spaced from the walls thereof, said dam surrounding the check valve and having a port in the side, and rising to a point near the top of the chamber, and a cap screwing into the pail cover at the top of the chamber and adapted to hold the dam in position.

5. In a milking machine, the combination with the milk pail, of a pail cover having a chamber therein open at the bottom to communicate with the inside of the pail, a combined valve seat and trap seating in said opening and rising to a considerable height above it, said combined valve seat and trap being spaced from the walls of the chamber and having a port in the bottom, a check valve controlling said port, and a vacuum duct leading from said chamber.

6. In a milking machine, the combination with the milk pail, of a pail cover having a chamber therein open at the bottom to communicate with the inside of the pail, a combined valve seat and trap seating in said opening and rising to a considerable height above it, said combined valve seat and trap being spaced from the walls of the chamber and having a port in the bottom, a check valve controlling said port, a vacuum pipe leading from the space in the chamber outside of the combined valve seat and trap, and means for securely holding said combined seat and trap in contact with the bottom of the chamber for preventing leakage.

7. In a milking machine, the combination, with the milk pail and pulsator, of a pail cover having a chamber open at the bottom to communicate with the inside of the pail, the cover having a passage leading from the pulsator to said chamber, a vacuum pipe leading from one side of said chamber, a combined valve seat and trap fitting the opening in the bottom of the chamber and having a port at the bottom, a check valve seating on said port, said combined valve seat and trap being spaced from the walls of the chamber and surrounding the check valve and being laterally spaced therefrom, said combined seat and trap having an opening near the top, and means for securely holding said combined seat and trap down in contact with the bottom of the chamber.

In witness whereof, I have hereunto subscribed my name.

ARTHUR C. MACARTNEY.